United States Patent
Heo

(10) Patent No.: US 7,649,503 B2
(45) Date of Patent: Jan. 19, 2010

(54) COMBINATION ETC TERMINAL AND REAR VIEW MIRROR FOR VEHICLES

(75) Inventor: Sung Wook Heo, Yongin-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 12/082,115

(22) Filed: Apr. 8, 2008

(65) Prior Publication Data

US 2009/0128432 A1    May 21, 2009

(30) Foreign Application Priority Data

Nov. 20, 2007    (KR) .................. 10-2007-0118772

(51) Int. Cl.
*H01Q 1/32*    (2006.01)
(52) U.S. Cl. .................. 343/713; 340/461; 340/928
(58) Field of Classification Search .............. 343/711, 343/713; 340/461, 928
See application file for complete search history.

(56) References Cited

U.S. PATENT DOCUMENTS 6,172,618 B1 *   1/2001   Hakozaki et al. ............ 235/382

2003/0107521 A1 *   6/2003   Matsuura et al. ............ 343/713

FOREIGN PATENT DOCUMENTS

JP    09121108 A   *   5/1997
JP    2006213132 A  *   8/2006

* cited by examiner

*Primary Examiner*—Tho G Phan
(74) *Attorney, Agent, or Firm*—Edwards Angell Palmer & Dodge LLP; Peter F. Corless

(57) ABSTRACT

A combination Electronic Toll Collection (ETC) terminal and rear view mirror for vehicles is disclosed. The rear view mirror includes a Radio Frequency (RF) antenna, and an ETC module. The RF antenna is fastened to the upper end of a stay in order to transmit and receive RF signals to and from an RF module, which is provided in a tollgate gantry. The ETC module is connected with the RF antenna using a wire, and is mounted in a housing. Thus, the uninterrupted transmission and reception of RF signals between the ECT terminal and the RF module can be stably performed even when a vehicle passes through a tollgate at a high speed.

7 Claims, 5 Drawing Sheets

COMBINATION ETC TERMINAL AND REAR VIEW MIRROR FOR VEHICLES

CROSS-REFERENCE TO RELATED APPLICATIONS

This application claims priority to Korean Application No. 10-2007-0118772, filed on Nov. 20, 2007, the disclosure of which is incorporated herein by reference.

BACKGROUND

1. Technical Field

The present invention relates to a combination Electronic Toll Collection (hereinafter abbreviated as "ETC") terminal and rear view mirror for vehicles, in which an ETC terminal is integrated with a rear view mirror, thus increasing the efficiency of space usage and improving the performance of communication.

2. Background Art

ETC terminals have been used to pay tolls electronically, which makes drivers feel convenient and improves traffic flow. When a vehicle with an ETC terminal mounted enters into a communication region of a tollgate, a Radio Frequency (RF) module of a gantry, which is located at the tollgate, transmits a signal to initiate the collection of an electronic toll, and thus communication between the RF module and the ETC terminal is performed. By this communication, a toll is automatically collected when the vehicle passes through the tollgate on the condition that an electronic payment card is inserted into the ETC terminal tollgate.

It is preferred that the above-described ETC terminal be installed in front of a drivers seat. However, installation space for the ETC terminal is limited because various portable devices, including a navigation device and a monitor, are installed in front of the driver's seat. Furthermore, for unimpeded communication, it is preferred that the ETC terminal be mounted to the front windshield. However, this may obstruct the drivers view.

The information disclosed in this Background section is only for enhancement of understanding of the background of the invention and should not be taken as an acknowledgement or any form of suggestion that this information forms the prior art that is already known to a person skilled in the art.

SUMMARY OF THE DISCLOSURE

Accordingly, the present invention has been made keeping in mind the above problems occurring in the prior art, and one of the objects of the present invention is to provide a combination ETC terminal and rear view mirror, which can increase the efficiency of space usage and can improve the performance of communication.

Another object is to provide a combination ETC terminal and rear view mirror, which is applied to a vehicle in a built-in manner, so that RF signals can be uninterruptedly transmitted and received between the vehicle and an RF module even when the vehicle passes through a tollgate at a high speed in a short time, with the result that data processing for the identification of vehicles, the collection of tolls, and the like can be accurately performed.

Still another object is to provide a combination ETC terminal and rear view mirror, in which various components, such as an ETC module, a speaker, and a wire, are not exposed to the outside, thus realizing an excellent external appearance.

In one aspect, the present invention provides a combination ETC terminal and rear view mirror for a vehicle, which comprises: a stay fastened to a portion of the front windshield of a vehicle; a housing mounted to the front windshield via the stay, in which a mirror part and a cover are coupled; an ETC module mounted in the housing; and an RF antenna fastened to an upper end of the stay for transmitting and receiving RF signals to and from an RF module disposed outside the vehicle. The ETC module and the RF antenna are connected via a wire.

In a preferred embodiment, the wire passes both through an interior of the stay and an interior of the housing, without being exposed to an outside. Preferably, the wire has a length of less then 50 cm.

In another preferred embodiment, the housing is provided with a support part therein for stably connecting the wire to the ETC module, the support part being provided with a through-hole therein for guiding the wire.

In still another preferred embodiment, a speaker and a module switch part, which are connected to the ETC module, are provided on the housing or the cover.

In a further preferred embodiment, the upper end of the stay is provided with a guide groove, the RF antenna is fastened to an upper surface of a support plate, and the support plate is fitted into the guide groove, thereby fastening the RF antenna to the upper end of the stay.

Other aspects and preferred embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

Figure 1:
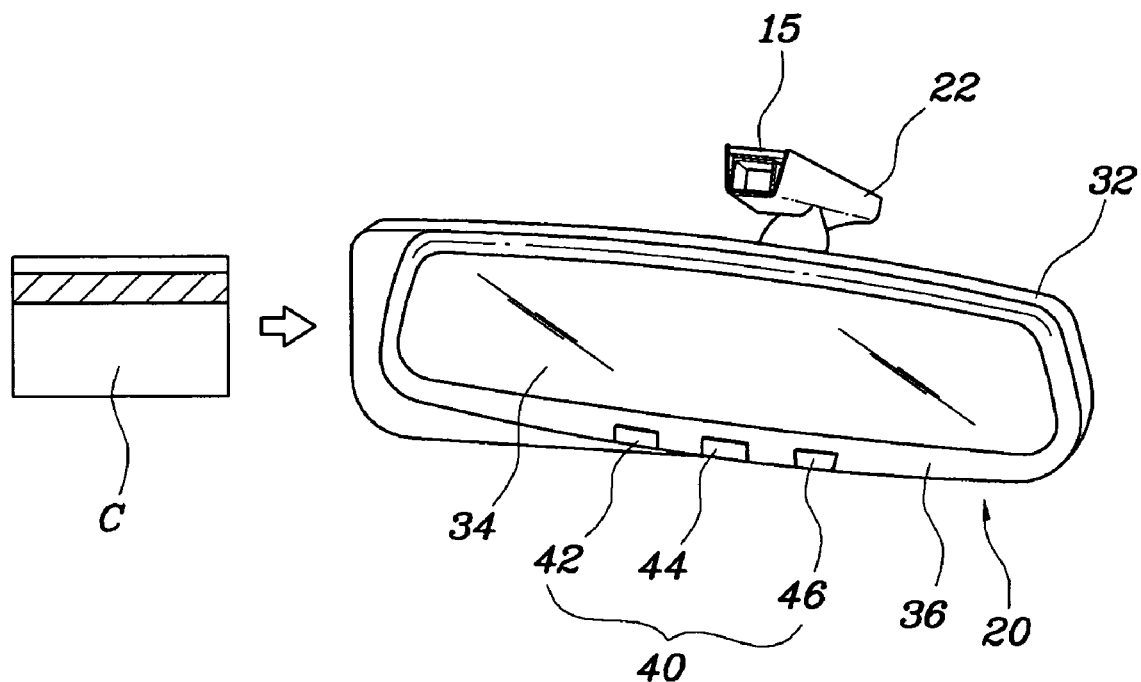
FIG. 1 is a perspective view of a combination ETC terminal and rear view mirror for vehicles according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

As discussed above, in one aspect, the present invention provides a combination ETC terminal and rear view mirror for a vehicle, which comprises: a stay fastened to a portion of the front windshield of a vehicle; a housing mounted to the front windshield via the stay, in which a mirror part and a cover are coupled; an ETC module mounted in the housing; and an RF antenna fastened to an upper end of the stay for transmitting and receiving RF signals to and from an RF module disposed outside the vehicle, wherein the ETC module and the RF antenna are connected via a wire.

Figure 2:
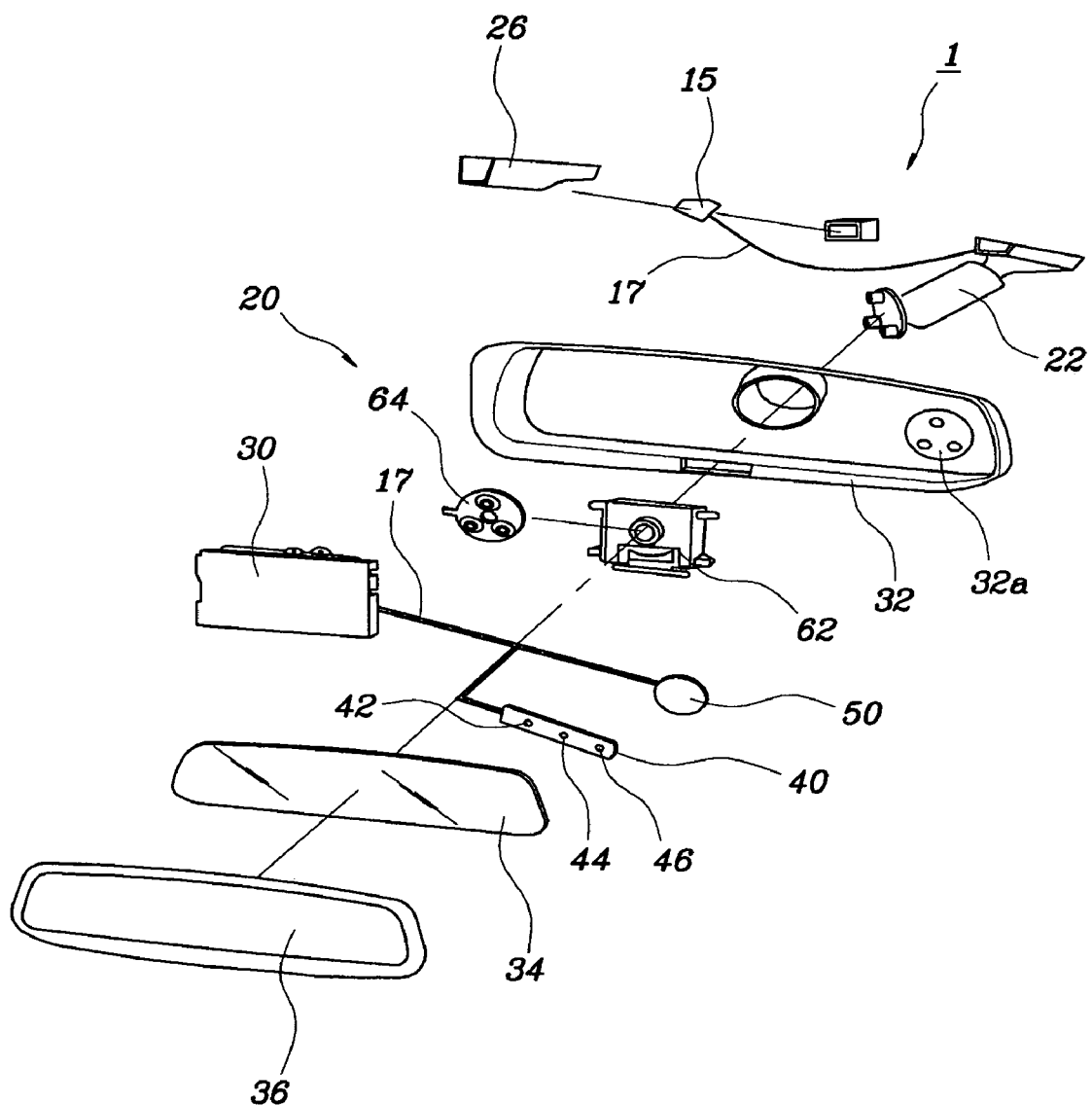
FIG. 2 is an exploded perspective view of the combination ETC terminal and rear view mirror for vehicles shown in FIG. 1.
Figure 3:
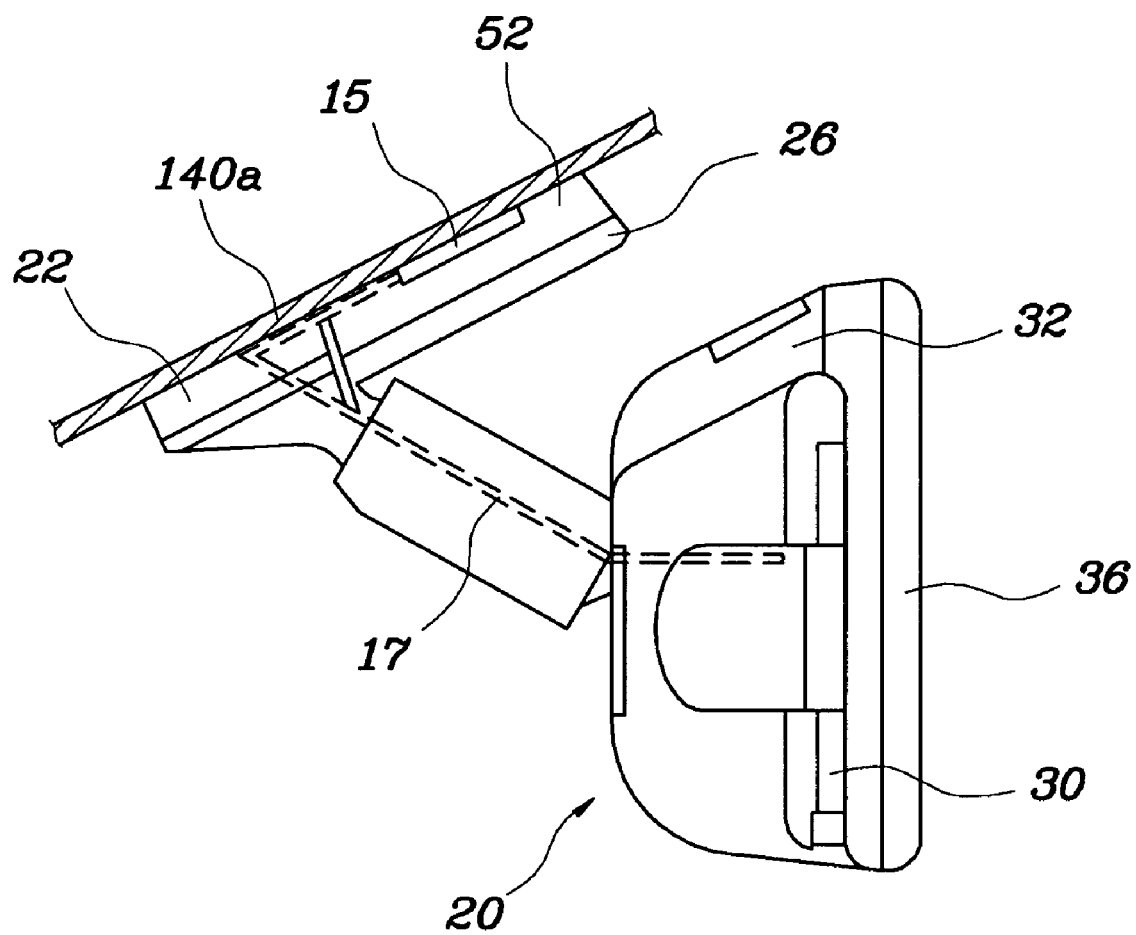
FIG. 3 is a side view of the combination ETC terminal and rear view mirror for vehicles shown in FIG. 1.

As shown in FIGS. 1 to 3, the rear view mirror 20 includes a stay 22 that is fastened to a portion of the front windshield 140a of a vehicle. The housing 32 is connected to the stay 22 so as to be able to rotate. Furthermore, the mirror part 34 is disposed in the front portion of the housing 32, and the cover 36 for fastening the mirror part 34 is provided. The RF antenna 15 is fastened to the stay 22. The ETC module 30 is connected with the RF antenna 15 via the wire 17, and is mounted in the rear view mirror 20. In order to stably connect the wire 17 to the ETC module 30 in the housing 32, a support part 62, in which a through-hole for guiding the wire 17 is formed, is mounted in the housing 32, and a support 64 is mounted to the support part 62.

The above-described rear view mirror 20 is configured such that the ETC terminal of the present invention is mounted in the internal space thereof. The ETC terminal is provided with the ETC module 30, into which a user card C is inserted. A module switch part 40 and a speaker 50, which are electrically connected to the ETC module 30, are installed on the housing 32 or the cover 36. In this case, it is preferred that the module switch part 40 be installed on the cover 36 for the convenience of operation, and that the speaker 50 be installed on the rear surface of the housing 32 for aesthetic reasons.

The ETC module 30 is implemented in an embedded circuit, and includes an RF processing unit, a power processing unit for supplying operational power, a memory unit for storing information about card transaction details, a user information interface unit for receiving information about items selected by a user or providing an interface for enabling the collection of tolls using the user card C, and a main control unit for controlling and managing the overall operation of these electrical circuits.

Furthermore, the module switch part 40 is provided with a power switch 42, a remaining money checking switch 44, and a volume control switch 46, and is disposed on the front surface of the cover 36 to be manipulated by the user.

Furthermore, the speaker 50 is a part that outputs various types of information, which are provided from the ETC module 30, to the outside, is tightly fitted into a speaker hole 32a formed in the housing 32, and is configured to provide notification of a menu and card transaction details to the user in the vehicle and to announce a series of procedures and processing results, relative to automatic toll collection, in voice form.

Figure 4A:
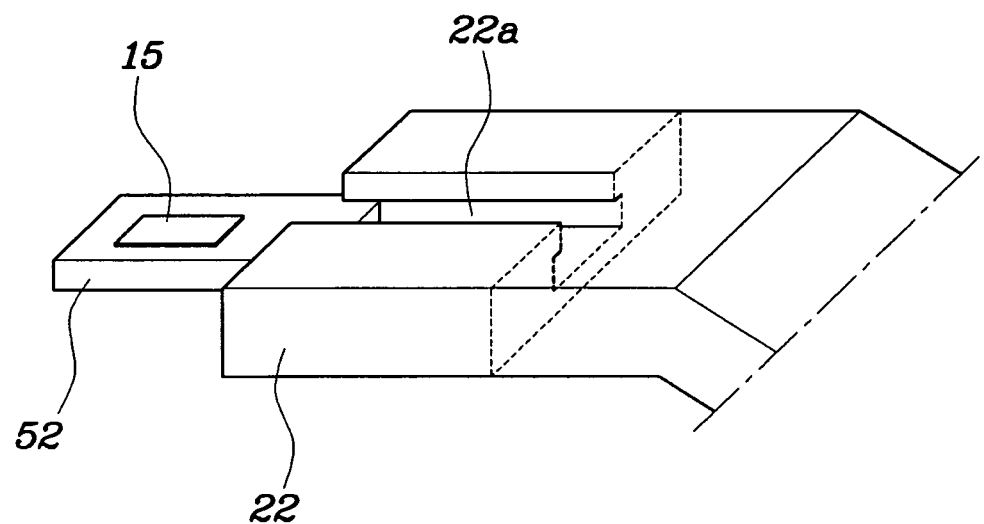
FIG. 4A is a view showing the construction in which an antenna and a support plate are mounted on a stay in the combination ETC terminal and rear view mirror for vehicles shown in FIG. 1.

Referring to FIG. 4A, the RF antenna 15 is fastened to a support plate 52 so as to prevent it from being moved by the vibration of the front windshield of the vehicle, which is generated while the vehicle travels, and is fitted into the guide groove 22a of the stay 22 using the support plate 52. That is, the RF antenna 15 is fastened to the support plate 52 using an adhesive agent, and the support plate 52 is fitted into the guide groove 22a of the stay 22, which is used to fasten the rear view mirror 20. With the above-described structure, the RF antenna 15 can be stably fastened close to the front windshield of the vehicle while the vehicle travels.

Figure 4B:
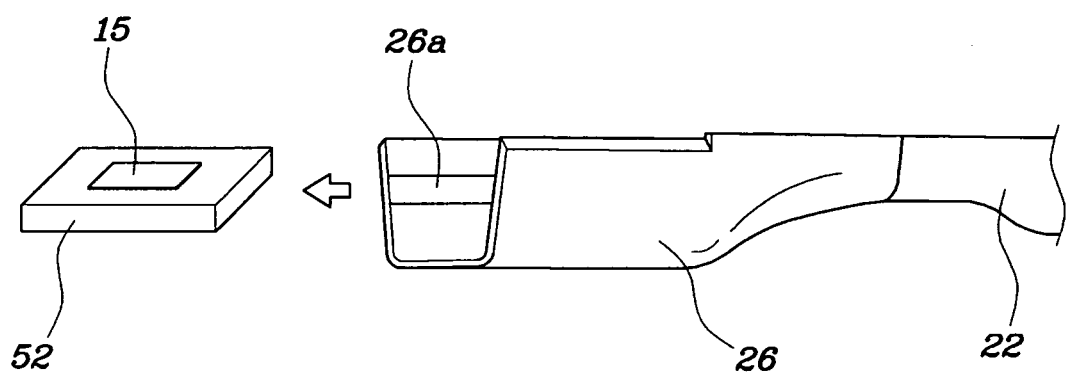
FIG. 4B is a view showing a construction in which an RF antenna and a support plate are fastened to a stay cover.

Furthermore, as shown in FIG. 4B, in the case where a stay cover 26 is coupled to the stay 22 to thus form a portion of the stay 22, the RF antenna 15 may be fastened to the upper surface of the support plate 52, and may be fitted into the cover groove 26a of the stay cover 26. The stay cover 26 is coupled to the stay 22 in a snap fit manner to protect the external appearance of the stay 22. As described above, the groove 26a is formed in the stay cover 26, and thus the RF antenna 15 can be fastened by fitting the support plate 52 into the groove 26a. From the above-described structure, the RF antenna 15 can be stably fastened close to the front windshield of the vehicle while the vehicle travels.

Figure 5:
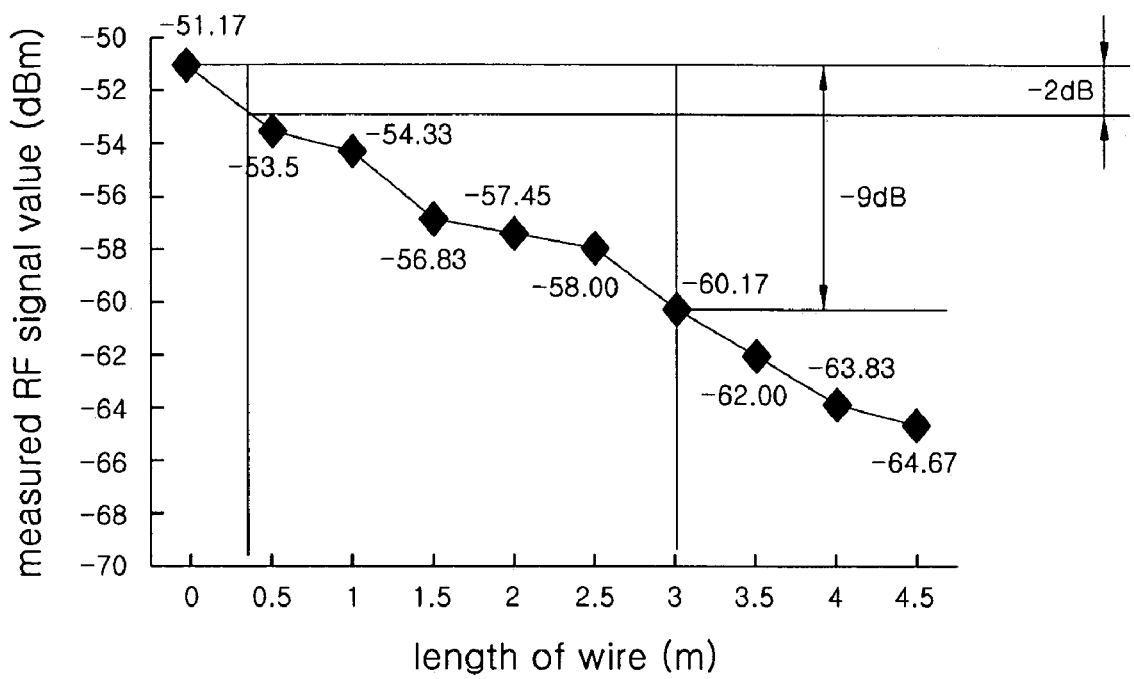
FIG. 5 is a graph showing the measured RF signal attenuation value over the length of the RF antenna, which is provided in the combination ETC terminal and rear view mirror for vehicles according to the embodiment of the present invention.

Furthermore, in the present invention, it is preferred that the wire 17, which is used to connect the RF antenna 15 and the ETC module 30, have a length of less than 50 cm. As shown in the experimental graph of FIG. 5, over the length of the wire 17, a signal attenuation of about −2 dB occurs during the process of transmitting an RF signal to the RF module of the tollgate in the case in which the wire 17 has a length of less than 50 cm. The length of the wire 17 must be set within an appropriate range.

However, when the length of the wire 17 is greater than 50 cm, the magnitude of the RF signal is gradually attenuated. For example, when the length of the wire 17 is greater than 3 m, a signal attenuation of about −9 dB occurs. This means that accurate RF signal transmission can be achieved only when the vehicle travels at a low speed. Accordingly, the most optimal results can be obtained only when the length of the wire 17 is less than 50 cm.

Furthermore, the present invention has a structure in which, in a process of connecting the RF antenna 15 to the ETC module 30, the wire 17 passes through the interior of the stay 22 but is not exposed to the outside. As shown in FIG. 3, the wire 17 passes through the interior of the stay 22, which is used to fasten the rear view mirror 20, but is not exposed to the outside, so that the interior of the vehicle can be designed to be attractive, that is, the internal aesthetics of the vehicle are not compromised.

In the combination ETC terminal and rear view mirror for vehicles according to present invention, the rear view mirror having the RF antenna is disposed on the front windshield of a vehicle, so that an appropriate distance from the RF module of a gantry, which is located at a tollgate, can be maintained. Accordingly, even when the vehicle passes through the tollgate in a short time at a high speed, for example, at a speed of 160 km/hr, the uninterrupted transmission and reception of RF signals can be performed between the ETC terminal of the vehicle and the RF module of the gantry, with the result that data processing for the identification of vehicles, the collection of tolls, and the like can be accurately performed.

Furthermore, in the present invention, the wire, which is used to connect the RF antenna with the ETC module, has a length of less than 50 cm, so that signal attenuation can be minimized, with the result that the uninterrupted transmission and reception of RF signals between the ETC terminal of the vehicle and the RF module of the gantry can be more stably performed.

Furthermore, in the present invention, the wire, which is used to connect the RF antenna with the ETC module, passes through the interior of the stay, which is used to fasten the rear view mirror, but is not exposed to the outside, so that the interior of the vehicle can be designed to be attractive, and the rear view mirror of the present invention can be implemented in the vehicle in a built-in manner.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A combination Electronic Toll Collection (ETC) terminal and rear view mirror for a vehicle, which comprises:
    a stay fastened to a portion of a front windshield of a vehicle;
    a housing mounted to the front windshield via the stay, in which a mirror part and a cover are coupled;
    an ETC module mounted in the housing; and
    a Radio Frequency (RF) antenna fastened to an upper end of the stay for transmitting and receiving RF signals to and from an RF module disposed outside the vehicle,
    wherein the ETC module and the RF antenna are connected via a wire, and the wire passes both through an interior of the stay and an interior of the housing, without being exposed to an outside and the wire has a length of less than 50 cm.

2. The combination ETC terminal and rear view mirror as set forth in claim 1, wherein the housing is provided with a support part therein for stably connecting the wire to the ETC module, the support part being provided with a through-hole therein for guiding the wire.

3. The combination ETC terminal and rear view mirror as set forth in claim 1, wherein a speaker and a module switch part, which are connected to the ETC module, are provided on the housing or the cover.

4. The combination ETC terminal and rear view mirror as set forth in claim 1, wherein the upper end of the stay is provided with a guide groove, the RF antenna is fastened to an upper surface of a support plate, and the support plate is fitted into the guide groove, thereby fastening the RF antenna to the upper end of the stay.

5. The combination ETC terminal and rear view mirror as set forth in claim 1, wherein the housing is provided with a support part therein for stably connecting the wire to the ETC module, the support part being provided with a through-hole therein for guiding the wire.

6. The combination ETC terminal and rear view mirror as set forth in claim 1, wherein a speaker and a module switch part, which connected to the ETC module, are provided on the housing or the cover.

7. A combination Electronic Toll Collection (ETC) terminal and rear view mirror for a vehicle, which comprises:
    a stay fastened to a portion of a front windshield of a vehicle;
    a housing mounted to the front windshield via the stay, in which a mirror part and a cover are coupled;
    an ETC module mounted in the housing; and
    a Radio Frequency (RF) antenna fastened to an upper end of the stay for transmitting and receiving RF signals to and from an RF module disposed outside the vehicle,
    wherein the ETC module and the RF antenna are connected via a wire, and
    the upper end of the stay is provided with a guide groove, the RF antenna is fastened to an upper surface of a support plate, and the support plate is fitted into the guide groove, thereby fastening the RF antenna to the upper end of the stay.

* * * * *